Feb. 21, 1967   E. J. SCHAAF   3,304,703
CORN HARVESTING MACHINE
Filed July 30, 1964   4 Sheets-Sheet 1
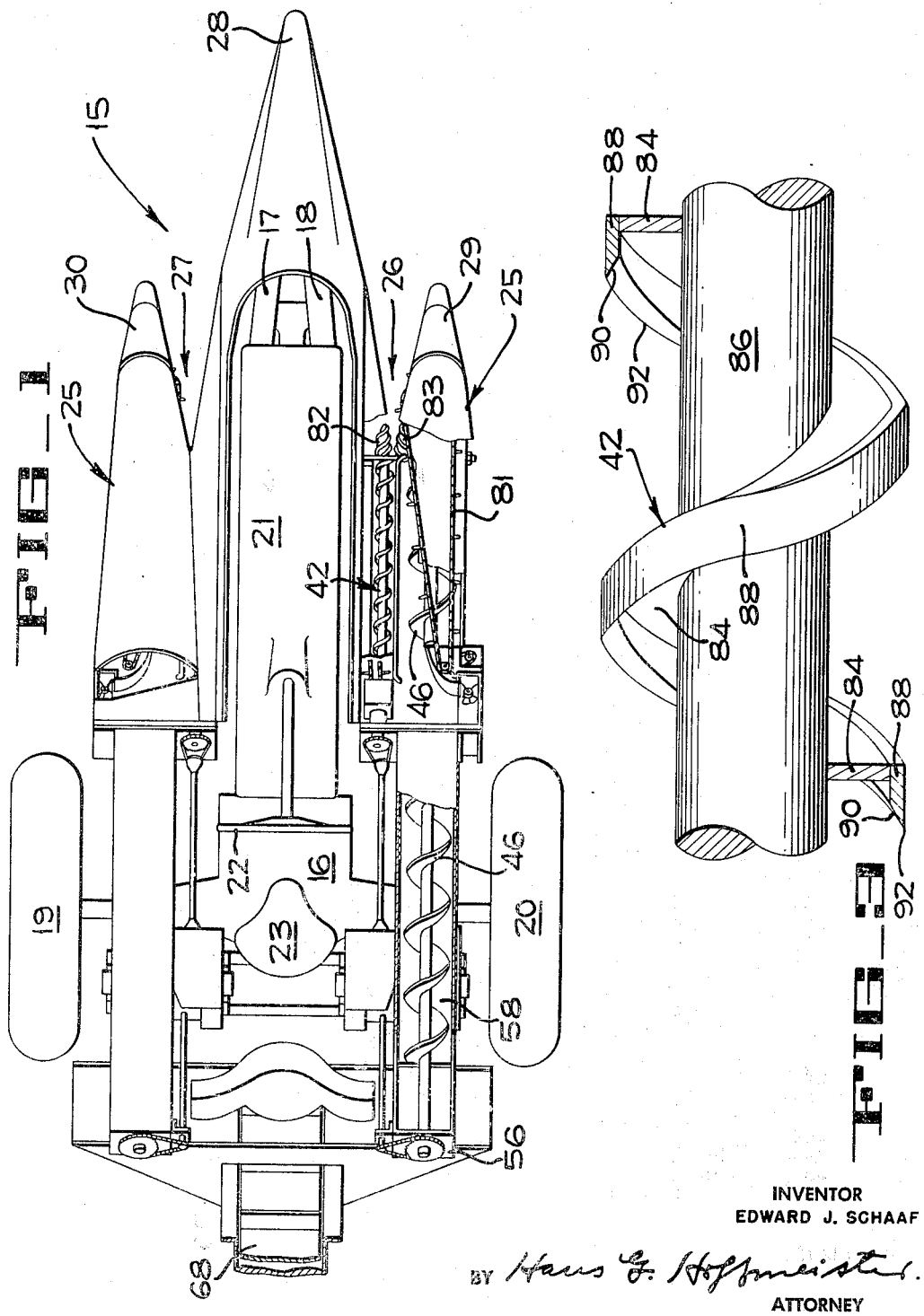
INVENTOR
EDWARD J. SCHAAF
BY Hans G. Hoffmeister
ATTORNEY

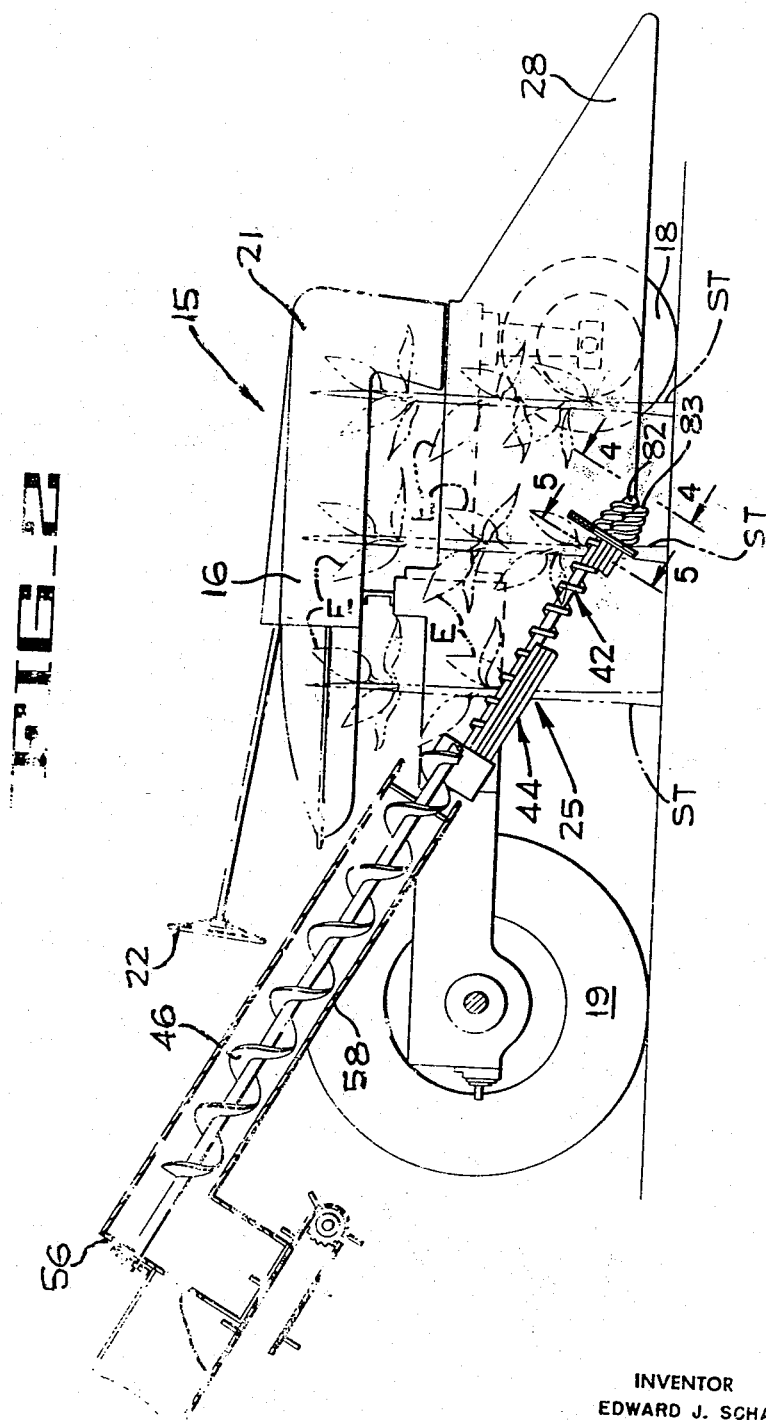

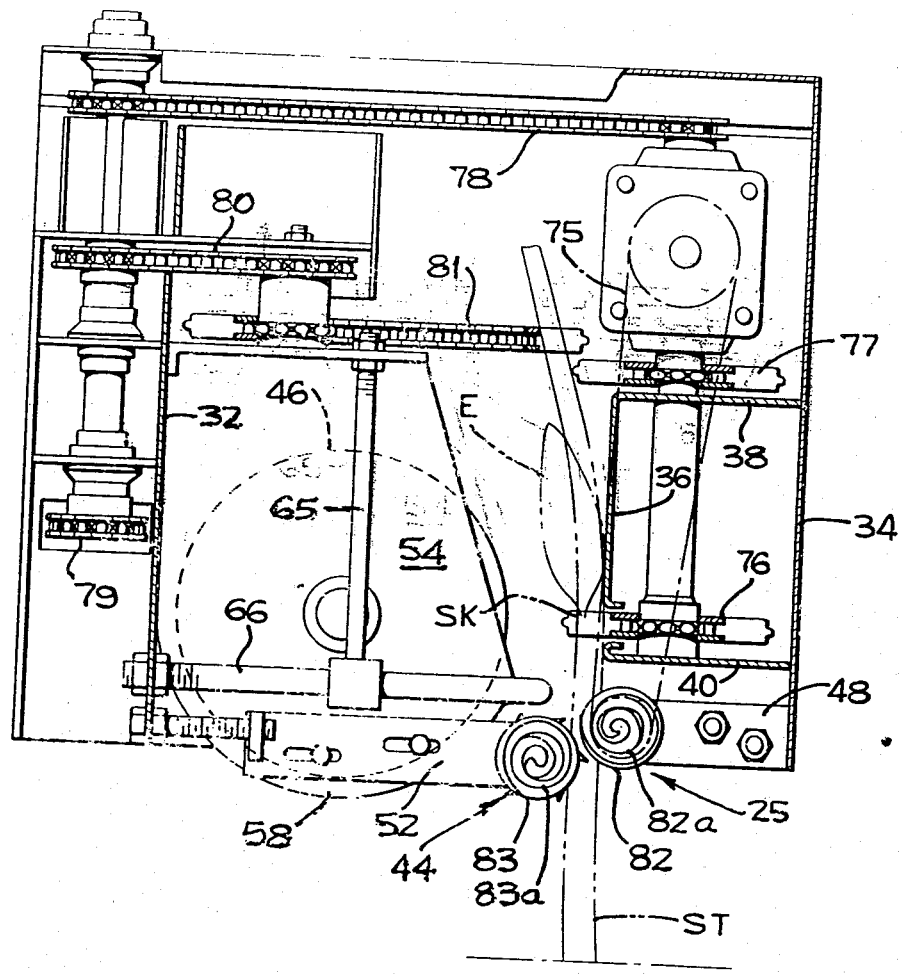
FIG_4

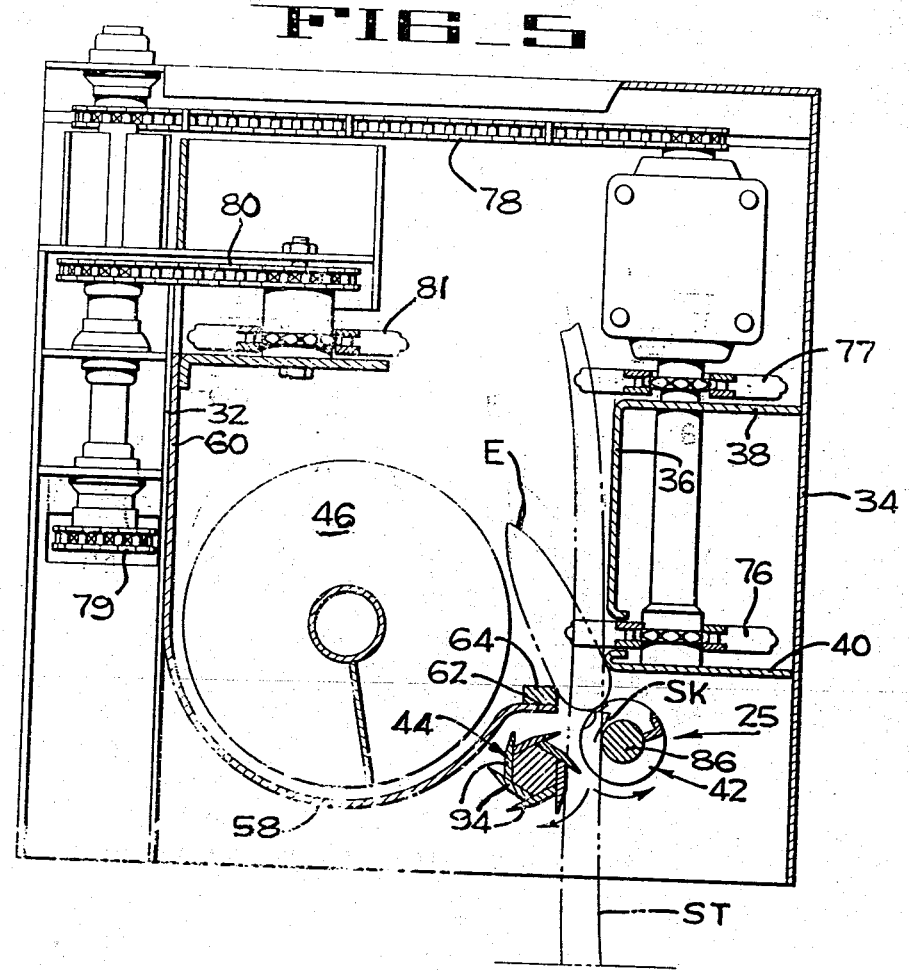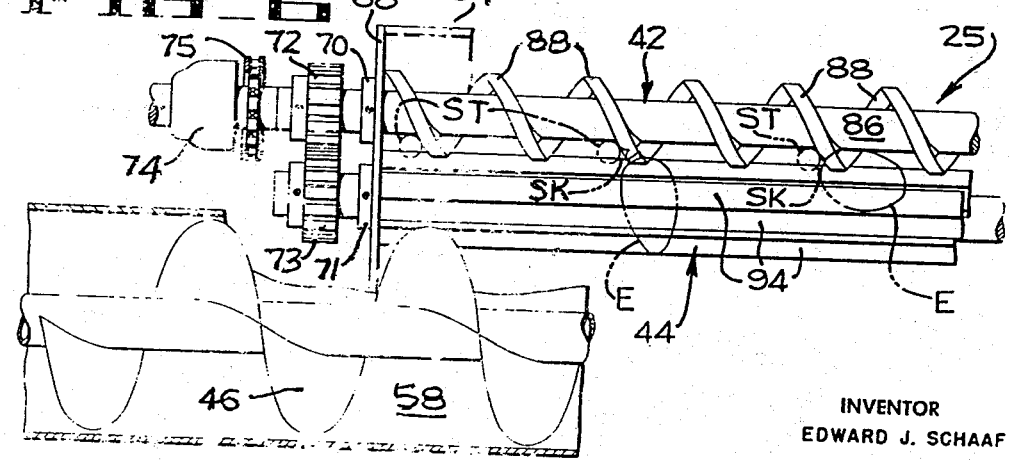

United States Patent Office 3,304,703
Patented Feb. 21, 1967

3,304,703
CORN HARVESTING MACHINE
Edward Jacob Schaaf, Hoopeston, Ill. 60942
Filed July 30, 1964, Ser. No. 386,311
3 Claims. (Cl. 56—117)

This invention relates to corn harvesting machines and another object of this invention is to sever the ears of corn from their shanks by cutting the shanks.

Another object is to provide a cutting device for corn pickers which presents a continuous helical cutting edge at the zone where removal of the ears from the stalks is effected, and which also contributes to holding the stalks in a pre-determined vertical orientation, as well as advancing the stalks.

Another object is to cut off ears of corn from their shanks at substantially equal distances from the butt ends of the ears.

The manner in which these and other objects of the invention are attained will be apparent from the following description of the invention, taken in connection with the accompanying drawings in which:

FIGURE 1 is a plan of a corn picker embodying the invention, with parts broken away.

FIGURE 2 is a side elevation of the corn picker, with parts broken away to show the rolls.

FIGURE 3 is an enlarged fragmentary elevation showing part of the helical ear shank cutting and stalk conveying roll.

FIGURE 4 is a fragmentary enlarged section taken substantially along lines 4—4 of FIGURE 2, showing in phantom outline a portion of a corn stalk and an attached ear before cutting.

FIGURE 5 is a view taken along lines 5—5 similar to FIGURE 4 showing the shank cutting operation.

FIGURE 6 is an enlarged fragmentary plan of the stalk pull roll, the helical roll, and the screw conveyor.

Referring now to FIGURES 1 and 2, a corn harvesting machine 15 constructed in accordance with this invention is shown. The general arrangement and drives for the various parts are like those of the patent to Schaaf et al. 2,676,450, issued April 27, 1954 and assigned to the assignee of the present invention. The picker 15 is mounted upon a tractor 16 that comprises a pair of cambered front wheels 17 and 18 and a pair of rear wheels 19 and 20, the motor 21, the steering wheel 22, and the driver's seat 23. Only the features of the machine critical to the present invention will be described in detail.

The corn harvesting machine 15 includes left and right picker heads 25 that are formed to provide parallel processing channels 26 and 27 located equi-distant from the longitudinal axis of the tractor 16. A central rearwardly diverging snout 28 is flanked by two rearwardly diverging smaller snouts 29 and 30, together defining converging passageways constituting the lead ins or entrances for the parallel processing channels 26 and 27.

The picker heads 25 are the same in construction and function, therefore description of one of the picker heads will apply to both.

The leading ends of the picker heads 25 of the corn harvesting machine 15 are located rather close to the ground, and the heads are inclined upwardly from their leading ends as seen in FIGURE 2. As the tractor advances in a direction parallel to the rows of corn, the portion of the stalk relatively close to the ground is directed by the converging snouts 29, 30 into each channel 26 and 27, wherein rolls are provided for manipulating the corn in such a manner that the ears are cut from their shanks as the tractor moves down the rows.

Each picker head 25 includes outer and inner vertical walls 32 and 34, and an intermediate vertical deck plate 36 (FIGS. 4 and 5). The lower end of the vertical deck plate 34 is connected to the inner wall 36 by upper and lower laterally extending spacer plates 38 and 40. Within the space provided by the walls 32 and 34 is a helical cutter roll 42 (FIGS. 5 and 6), a parallel stalk pull roll 44, and a screw conveyor 46 for the severed ears. These incline upwardly toward the rear (FIG. 2), and are mounted for rotation. The front end of the helical roll 42 is rotatably supported by an arm 48 which is secured to the wall 34. In similar manner, the stalk pull roll 44 has the forward end rotatably mounted in a bracket 52 that is adjustably mounted on a vertical plate 54 secured to and extending inwardly from the wall 32.

The forward end of the screw conveyor 46 is journalled in the plate 54 (FIGURE 4) and the rearward end is journalled in an end wall 56 (FIGURE 1) of the screw conveyor housing. An arcuate trough 58 is mounted closely adjacent the lower portion of the orbit of the screw conveyor 46, which trough includes a vertical flange portion 60 attached to the partition 32 (FIG. 5), and a lateral generally horizontal lip 62 over which is mounted a corn butt support bar 64. Rods 65 and 66 adjustably position the bar 64. The trough 58 in conjunction with the rotating screw conveyor 46 is operative to convey ears of corn severed by the helical roll 42 toward the rear wall 56, where the ears drop to a central elevating conveyor 68, which conveys the severed ears into any suitable container which follows the progress of the tractor along the rows of corn.

The rearward ends of the rolls 42 and 44 project through another partition 68 (FIG. 6) that is connected to and extends inwardly from the partition 34. Partition 68 mounts bearings 70 and 71 for rotatably supporting the rearward ends of the rolls 42 and 44. Meshing gears 72 and 73 are keyed to the rolls 42 and 44 respectively, and provide a driving connection so that the rolls are driven simultaneously and in opposite directions, as indicated by arrows in FIGURE 5. The helical roll 42 is driven by a coupling 74 leading to the power takeoff (not shown) of the tractor.

A chain 75 extends vertically (FIG. 4) for driving inner stalk gathering conveyors 76 and 77. Chains 78, 79 and 80, and other gearing (not shown) drive an outer stalk gathering conveyor 81. The details of these conveyor drives are not critical to the present invention, and are clearly disclosed in the aforesaid Schaaf et al. patent. The forward ends of rolls 42, 44 mount generally conical noses 82 and 83, provided with screw threads 82a and 83a (FIG. 4) that cooperate to draw the stalks of corn into the processing channel between the rolls.

The preferred construction of the helical shank cutting rotor 42 is illustrated on an enlarged scale in FIGURE 3. A radially disposed helical rib 84 is welded to the roll shaft 86. A helically formed flat ribbon 88 is welded to the outer edge of the helical rib 84 in cantilever fashion, so that the rearward lateral edge of the ribbon 88 overhangs the rib 84. The free edge of the helical ribbon 88 is beveled at 90 to define a knife edge 92 which is directed axially rearwardly relative to the motion of the harvesting machine. The lead of the helical rib 84 is of sufficient length to accommodate at least one corn stalk ST therebetween, and the radial distance of the cutting edge 92 from the periphery of the shaft 86 has been chosen to approximately equal the average diameter of the corn stalks (see FIG. 6). The tractor drive gearing and the drive to the helical roll 42 is such that as the corn picker advances, the cornstalks ST remain substantially vertical, as the helical roll passes along the stalks.

As shown in FIGURES 5 and 6, the stalk pull roll 44 is closely adjacent to and longitudinally coextensive with the helical cutting roll 42. The pull roll 44 mounts generally tangential, circumferentially spaced blades 94 that engage the corn stalks ST (FIGS. 4–6). The roll 44 may be characterized as a discontinuous pinch roller which co-operated with the helical roll shaft 86 to provide a passageway for the corn stalks ST. The blades of roll 44 exert an effective tractive downward pull on the stalk ST, but do not perform the shank severing operation in the present invention.

In operation, and referring to FIGURE 2, it can be seen that as the tractor advances along the rows of corn the cornstalks ST will be guided between the conical noses 82 and 83, and as seen in FIGURE 6 will enter the passageway formed between the helical roll shaft 86 and the blades 94 on the pull roll 44. Due to the inclination of these rolls, as seen in FIGURE 2, the rolls in effect move upwardly towards the butts of the ears E on the cornstalks ST. The pull roll 44 prevents uprooting of the cornstalks and provides a holding force for the stalks as required. As the ears of corn E enter the machine the stalks ST are gathered by the conveyors 76, 77, and 81, as seen in FIGURE 4, and are oriented vertically or substantially so. The ears of corn E may be extending in various directions but the relative motion of the ears of corn relative to the deck plate 36 sweeps the ears rearwardly, so that substantially all ears are on the forward or leading side of the cornstalk ST, and tend to rest against the deck plate 36. This brings the ear shanks SK on the forward side of the cornstalk ST, for presentment to the cutting edge 92 of the helical roll 42. During the initial part of the action the stalks ST, and their ears E are mainly stationary, relative to the ground, and pass through the passageway between the shaft 86 on the helical roll 42 and the pull roll 44 as the machine advances along the row.

However, as seen in FIGURE 5, when the machine has advanced far enough along a stalk so that the butt of a given ear E is brought against the bar 64, which is above the pull roll 44, if any of the ears have fallen away from the vertical deck plate 36 this will bring them partially or substantially upright again so that the shank SK that connects the ear E to the cornstalk ST confronts the rearwardly facing knife edge on the helical roll 42. Thus, there is a combined restraining action of the bar 64 on the butt of the ear of corn E, and the action of the pull roll 44 on the stalk ST in temporarily restraining the stalk from upward motion relative to the corn picker. When this happens the helical knife slices through the shank SK joining the ear of corn E to the stalk ST close to the butt of the ear of corn, as illustrated in FIGURE 5. This slicing action takes place without bruising impact of the corn against the bar 64, and yet severs the shank SK at the butt, providing a market attractive close cutting operation.

The severed ears fall within the flight of the screw conveyor 46, and are removed in the conventional manner as the machine advances, and any ears above the ear E, just discussed, are again picked up by the bar 64 and their shanks severed as described above. If any ears are on the stalks at a position above the vertical range of action of the helical cutting roll 42, the stalks will be bent over and the ears removed as in the aforesaid patent to Schaaf et al., the details of this phase of the operation not being part of the present invention. The machine is designed so that substantially all of the ears will be severed by the helical roll 42 close to the butts of such ears.

Thus, the helical roll 42 acts as a corn stalk passage conveyor and a shank severing knife to produce short shanks without bruising the ears, and without requiring severing or pulling of the shanks from the stalks.

Having completed a detailed description of the invention so that those skilled in the art may practice the same, I claim:

1. A corn harvesting machine comprising a frame, a pair of laterally spaced, downwardly inclined rolls rotatably mounted in said frame, means for rotating said rolls in opposite directions with their adjacent inner side portions moving downward, one of said rolls comprising an elongated helix with a peripheral, rearwardly facing cutting edge, a corn butt supporting bar above the other roll, said bar being parallel to but laterally spaced from said helix, a vertical corn ear alignment deck plate above said helix and spaced inwardly of the inner side portion of the helix, means for guiding corn stalks between said rolls substantially within the radial confines of the cutting edge of said helix, and between adjacent convolutions of the helix as the machine advances along a row of corn, said bar supporting an ear butt as the cutting edge of said helix slices through the ear shank, and conveyor means for removing the ears.

2. A corn harvesting machine comprising a frame, a pair of laterally spaced, downwardly inclined rolls rotatably mounted in said frame, means for rotating said rolls in opposite directions with their adjacent inner side portions moving downward, one of said rolls comprising a central shaft mounting a helically formed, flat ribbon, said ribbon having a rearwardly facing peripheral cutting edge, a corn butt supporting bar above the other roll, said bar being parallel to but laterally spaced from said helix, a vertical corn ear alignment deck plate above said helix and in substantial alignment with the inner side of the helix shaft, means for guiding corn stalks between said other roll and the helix shaft, and between adjacent convolutions of said ribbon as the machine advances along a row of corn, said bar supporting an ear butt as cutting edge of said helix slices through the ear shank, and conveyor means for removing the ears.

3. A corn harvesting machine comprising a frame, a pair of laterally spaced, downwardly inclined rolls rotatably mounted in said frame, means mounting said rolls with their peripheries having a fixed minimum spacing, means for rotating said rolls in opposite directions with their adjacent inner side portions moving downward, one of said rolls comprising a central shaft mounting an elongated helix with a peripheral, rearwardly facing cutting edge, the other of said rolls comprising a corn stalk pull roll having stalk gripping blades, a corn butt supporting bar above said pull roll, said bar being parallel to but laterally spaced from said helix and in substantial alignment with the inner side of the helix shaft, and means for guiding corn stalks between said rolls and substantially within the radial confines of the cutting edge of said helix, and between adjacent convolutions of the helix as the machine advances along a row of corn, said bar supporting an ear butt as cutting edge of said helix slices through the ear shank, and conveyor means for removing the ears.

References Cited by the Examiner

UNITED STATES PATENTS

| 925,749 | 6/1909 | Butler et al. | 56—64 |
| 2,676,450 | 4/1954 | Schaaf et al. | 56—66 |

ABRAHAM G. STONE, *Primary Examiner.*

ANTONIO F. GUIDA, *Examiner.*